(12) United States Patent
Lawrence

(10) Patent No.: US 7,264,107 B2
(45) Date of Patent: Sep. 4, 2007

(54) FOOD OBJECT TRANSFER SYSTEM AND METHOD

(75) Inventor: Eric C. Lawrence, South El Monte, CA (US)

(73) Assignee: Lawrence Equipment, Inc., South El Monte, CA (US)

( * ) Notice: Subject to any disclaimer, the term of this patent is extended or adjusted under 35 U.S.C. 154(b) by 68 days.

(21) Appl. No.: 10/957,293

(22) Filed: Sep. 30, 2004

(65) Prior Publication Data

US 2005/0067256 A1   Mar. 31, 2005

Related U.S. Application Data

(60) Provisional application No. 60/481,453, filed on Sep. 30, 2003.

(51) Int. Cl.
  *B65G 15/12* (2006.01)
  *B65G 47/252* (2006.01)

(52) U.S. Cl. .................. 198/404; 198/603; 198/605; 198/560; 99/386; 99/423; 99/443 C

(58) Field of Classification Search ............... 198/404, 198/603, 605, 560; 99/386, 423, 443 C
See application file for complete search history.

(56) References Cited

U.S. PATENT DOCUMENTS

| 1,345,301 | A |   | 6/1920  | Winchester |
|-----------|---|---|---------|------------|
| 2,006,870 | A |   | 7/1935  | Neuman     |
| 2,152,939 | A | * | 4/1939  | Wentworth ................. 198/603 |
| 2,391,691 | A |   | 12/1945 | Engels     |
| 2,709,412 | A |   | 5/1955  | Eagerman ..................... 107/57 |
| 4,677,589 | A | * | 6/1987  | Haskell et al. .............. 365/149 |
| 4,711,164 | A | * | 12/1987 | Mendoza ..................... 99/339 |
| 4,715,272 | A |   | 12/1987 | Mendoza ..................... 99/339 |
| 4,934,513 | A |   | 6/1990  | Kirkpatrick et al. ........ 198/612 |
| 5,392,696 | A |   | 2/1995  | Navarro et al. ............... 99/339 |
| 5,423,414 | A | * | 6/1995  | Vaughn et al. .............. 198/603 |
| 5,590,588 | A | * | 1/1997  | Tomimatsu ................... 99/423 |
| 5,909,798 | A | * | 6/1999  | Shaver et al. ............... 198/603 |
| 2005/0077150 | A1 | * | 4/2005 | Dickinson et al. .......... 198/603 |

* cited by examiner

*Primary Examiner*—Mark A. Deuble
(74) *Attorney, Agent, or Firm*—Robert J. Rose; Sheldon Mak Rose & Anderson PC

(57) ABSTRACT

A system for transferring an object between driven conveyors comprising an upper conveyor comprising a discharge end, a first belt for transporting the object, the first belt engaging a first end roller and a gooseneck roller, where the first end roller is disposed below the gooseneck roller by a displacement sufficient to create a downward sloping section in the first belt; a transfer guide located adjacent to the discharge end of the upper conveyor, to receive the object from the downward sloping section; a lower conveyor comprising a second belt to receive the object from the transfer guide; and means for driving the upper conveyor and lower conveyor such that the first belt moves towards the transfer guide and the second belt moves away from transfer guide. A lower run of the first belt may be disposed above an upper run of the second belt by a belt spacing approximately equal to or less than the thickness of the object.

14 Claims, 8 Drawing Sheets

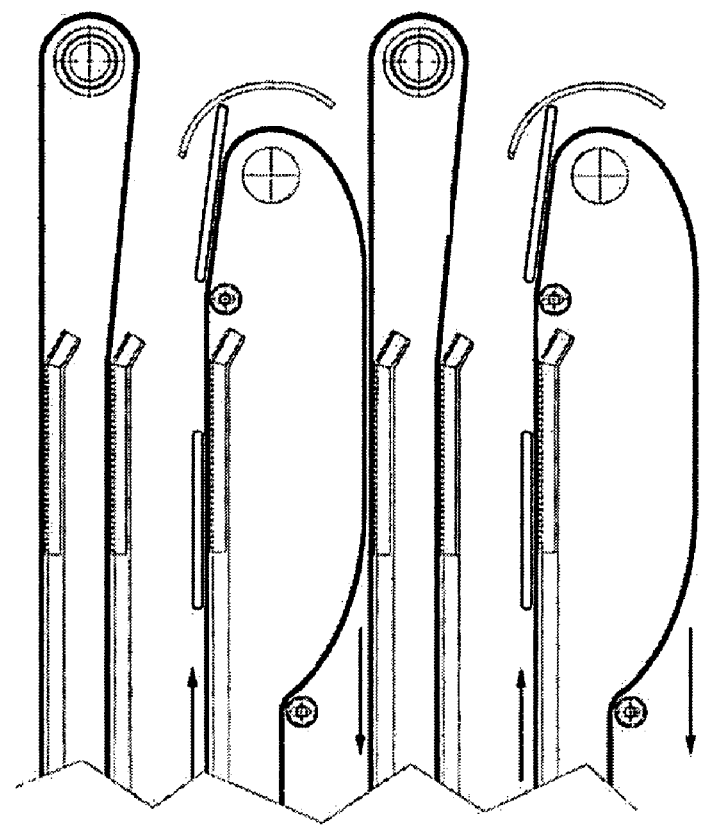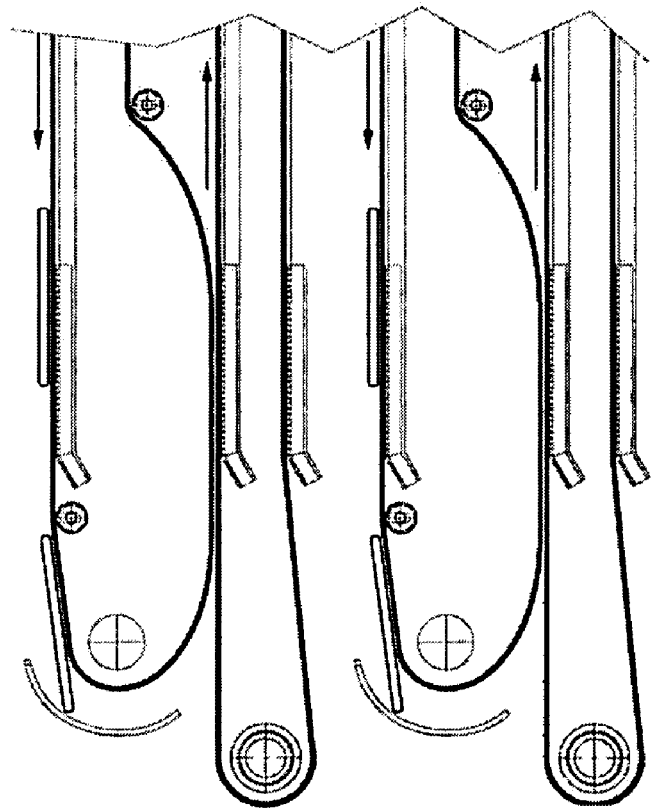
Fig. 6

FOOD OBJECT TRANSFER SYSTEM AND METHOD

CROSS REFERENCE TO RELATED APPLICATIONS

This application claims the benefit of U.S. provisional application Ser. No. 60/481,453, titled "Gooseneck Turnaround" filed Sep. 30, 2003, the entire contents of which are hereby incorporated herein by reference.

BACKGROUND OF THE INVENTION

The present invention relates to power driven conveyors and more particularly, to a system and method for conveying objects from one power driven conveyor to another power driven conveyor. The system and method can be used for any object moving on a conveyor belt, but will be discussed in the context of tortillas.

Tortillas can be removed from one conveyor belt and transported to another by manual labor, but this is not commercially acceptable, because labor is relatively expensive and workers have difficulty removing the hot tortillas at the speed necessary for large volume commercial production. Workers also create non-uniform spacing between tortillas and damage the tortillas, because of the tortillas' tendency to adhere to the conveyor belt surface. In order to efficiently process tortillas there is a need to automate removal and transport.

Particularly in the commercial baking industry, the use of conveyors for the movement of tortillas, and other food objects, is generally well known. Examples of conveyors include, but are not limited to, an endless belt conveyor driven around two or more axles. Typically, one axle is powered and the others are non-powered or idler axles. In the food industry in particular, it is common to construct multi-tiered conveyors, of two or more paired conveyors traveling in opposing clockwise and counterclockwise directions, and it is necessary to transfer objects between the successive levels of such multi-tiered conveyor systems.

As shown in FIG. 1, one solution used with tortilla manufacturing is to place arcuate transfer guides at the ends of each pair of belts where the tortillas are transferred from an upper belt to the next lower belt. The guides provide a stationary curved transfer surface extending between the respective exit and entry ends of the pair of belts upon and along which the tortillas discharging off the exit end of the upper belt are guided to slide downwardly to the entry end of the next lower belt. Examples of such transfer guides are found in U.S. Pat. No. 5,392,696 to Navarro, et al for a "Tortilla transfer guide and method for transferring tortillas"; U.S. Pat. No. 4,715,272 to Mendoza for a "System for preparing tortillas" and U.S. Pat. No. 2,709,412 to Eagerman for an "Automatic baking oven."

Generally, an automated apparatus employing multi-tiered conveyors operates at high speeds to produce more product in less time. The high speed of the apparatus requires that product flow not be slowed down at any point. Additionally, in the event of a jam up, the affected area should be easy to clean without production being affected. A transfer system should provide as little resistance as possible so as not to hinder product flow. Preferably a system should be incorporated to permit fast and easy removal of jams.

With baked tortilla products, undercooked or unpressed dough pieces may be present on the conveyor. Because these products are typically sticky, or too large to pass through the gravity transfer guide, they become stuck to the guide, or stuck in the area between the conveyor and the guide. Limiting the time spent on the guide to a minimum reduces the likelihood of the product being becoming stuck.

In addition, as the tortilla transfers from the upper conveyor to the transfer guide it increases in speed, and as it enters onto the lower conveyor it may slide forward having a longitudinal speed relative to the belt speed of the lower conveyor. This results in uneven longitudinal spacing between the tortillas, which is undesirable. In some instances, overlapping may even occur.

Prior art systems do not meet these needs, and may even exacerbate longitudinal spacing problems. For example, in one prior art system an attempt is made to guide or move the dough piece to correct lateral displacement. However, this system only slows the longitudinal forward travel of the piece, resulting in uneven longitudinal speeds and spacing of the food products. The need for maintaining proper spacing rather then correcting misplacement is more beneficial for high speed production lines.

What is needed is a transfer system and method which minimizes the time the product spends on the guide, preferably maintains longitudinal spacing of product after transfer, and preferably permits easy clearing of trapped pieces.

SUMMARY OF INVENTION

The present invention meets these needs by providing a system for transferring an object between driven conveyors, comprising an upper conveyor (10) comprising a discharge end; a first belt (18) for transporting the object, the first belt engaging a first end roller (20); and a gooseneck roller (16), where the first end roller is disposed below the gooseneck roller by a displacement sufficient to create a downward sloping section (22) in the first belt; a transfer guide located adjacent to the discharge end of the upper conveyor, to receive the object from the downward sloping section; a lower conveyor (12) comprising a second belt (30) to receive the object from the transfer guide; and means for driving the upper conveyor and lower conveyor such that the first belt moves towards the transfer guide and the second belt moves away from transfer guide.

Preferably, but optionally, the first belt and the second belt are endless and move at approximately the same speed. Preferably, but optionally, the transfer guide comprises laterally spaced individual curved wire rods connected to a common axle, wherein the rods are relatively short. Further, the common axle may be pivotably mounted.

In another embodiment, the system comprises an upper conveyor (10) comprising a discharge end; a first belt (18) for transporting the object and having an upper run and a lower run, the first belt engaging a first end roller (20); a transfer guide located adjacent to the discharge end of the upper conveyor, to receive the object from the upper conveyor; a lower conveyor (12) comprising a second belt (30) having an upper run and a lower run, to receive the object from the transfer guide; means for driving the upper conveyor and lower conveyor such that the upper run of the first belt moves towards the transfer guide and the upper run of the second belt moves away from transfer guide; wherein the lower run of the first belt is disposed above the upper run of the second belt by a belt spacing approximately equal to or less than the thickness of the object. Preferably, but optionally, the belt spacing is zero.

Therefore, a system for transferring an object between driven conveyors is disclosed comprising means for transporting the object on a first belt on an upper conveyor (10) having a discharge end characterized by a downward sloping section (22); means for transferring the object from the discharge end of the upper conveyor; means for receiving the object onto a lower conveyor (12) comprising a second belt (30); and means for driving the upper conveyor and lower conveyor such that the first belt moves towards the means for transferring and the second belt moves away from the means for transferring.

In another embodiment, the object has a thickness, the system comprises means for transporting the object on an upper conveyor (10) comprising a first belt (18) having a discharge end; means for transferring the object from the discharge end of the upper conveyor; means for receiving the object onto a lower conveyor (12) comprising a second belt (30), the object having a longitudinal speed relative to the second belt; means for modifying the longitudinal speed of the object after it is received onto the lower conveyor; and means for driving the upper conveyor and lower conveyor such that the first belt moves towards the transfer chute and the second belt moves away from transfer chute.

A method is disclosed for transferring an object between driven conveyors, comprising the steps transporting the object on a first belt on an upper conveyor (10) having a discharge end characterized by a downward sloping section (22); transferring the object from the discharge end of the upper conveyor through a transfer chute located adjacent to the discharge end of the upper conveyor; receiving the object from the discharge chute onto a lower conveyor (12) comprising a second belt (30); and driving the upper conveyor and lower conveyor such that the first belt moves towards the transfer chute and the second belt moves away from the transfer chute.

In another embodiment, the object has a thickness, the method comprises the steps of transporting the object on a first belt having an upper run and a lower run on an upper conveyor (10) having a discharge end; transferring the object from the discharge end of the upper conveyor through a transfer chute located adjacent to the discharge end of the upper conveyor; receiving the object from the discharge chute onto a lower conveyor (12) comprising a second belt (30) having an upper run and a lower run, the object having a longitudinal speed relative to the second belt; modifying the longitudinal speed of the object by having the object contact the lower run of the first belt after it is received onto the lower conveyor; and driving the upper conveyor and the lower conveyor such that the upper run of the first belt moves towards the transfer chute and the upper run of the second belt moves away from transfer chute.

Aspects of the various embodiments may be combined.

BRIEF DESCRIPTION OF DRAWINGS

These and other features, aspects, and advantages of the present invention will become better understood with reference to the following description, appended claims, and accompanying drawings, where:

FIG. 6 is a side elevation view of a sample multi-tiered system using the embodiment of the present invention shown in FIG. 4.

DETAILED DESCRIPTION

Figure 1:
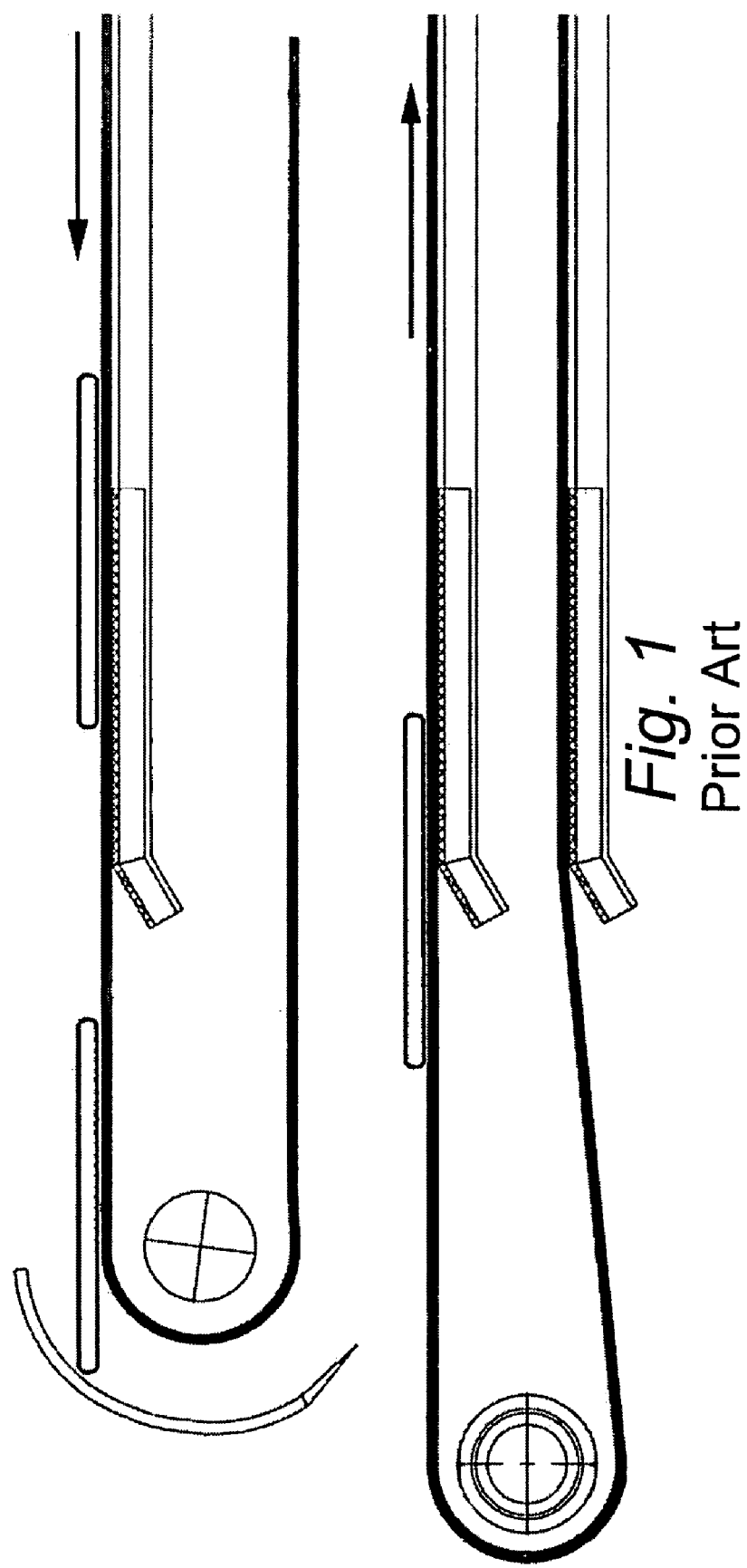
FIG. 1 is a side elevation view of a prior art system for transferring food objects between conveyors.
Figure 2:
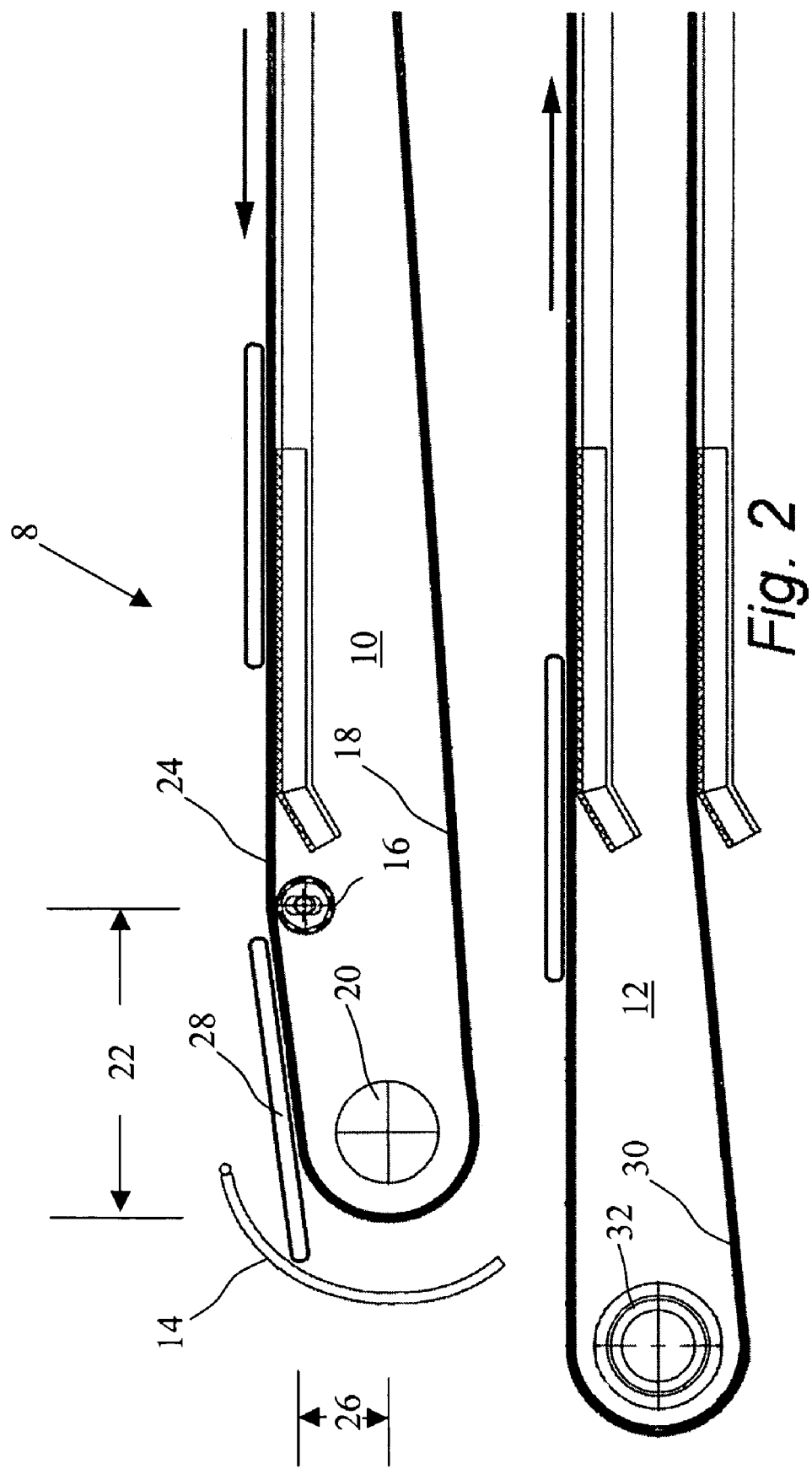
FIG. 2 is a side elevation view of one embodiment of the present invention for transferring food objects between conveyors, showing the gooseneck bend in the upper conveyor, and a relatively shortened wire transfer guide.

Turning now to the drawings, a first embodiment of the food object transfer system 8, illustrated in FIG. 2, includes an upper conveyor 10, a lower conveyor 12, a transfer guide 14, a gooseneck roller 16, and means for driving these component parts (not shown). Means for driving conveyors will be known to those of ordinary skill in the art with reference to this disclosure. The upper conveyor 10 has a first endless belt 18 supported between two end rollers (only a first end roller 20 on the left side, in this case an idler roller, is shown in FIG. 2) and the gooseneck roller 16. The belt 18 is sufficiently wide to accommodate processing of the subject objects. Optionally, for example, it may be sufficiently wide to accommodate rows of tortillas side-by-side.

With reference to FIG. 2, it can be seen that the first end roller 20 is disposed below the gooseneck roller 16 by a displacement 26. This displacement 26 results in a declining, or a downward sloping, section 22 of the belt 18, proximate to a discharge end of the upper conveyor 10 and leading into the transfer guide 14, and presents a profile that may be described as a "gooseneck." The gooseneck roller 16 may comprise a series of rollers, or a single roller, or other design as will be evident to those skilled in the art with reference to this disclosure.

The displacement 26 results in the upper surface 24 of belt 18 creating an angle from the horizontal. The amount of the displacement should be sufficient to allow a product 28 to move downward at an angle suited to the conveyor design, so that the transfer guide 14 provides as little resistance as possible, so as not to hinder product flow. The transfer guide 14 should be positioned in such a manner that the angle at which the product contacts the guide is as close to tangent to the direction of travel as possible. Once contacted, the transfer guide 14 directs the product flow downward in a generally curved path.

Figure 7:
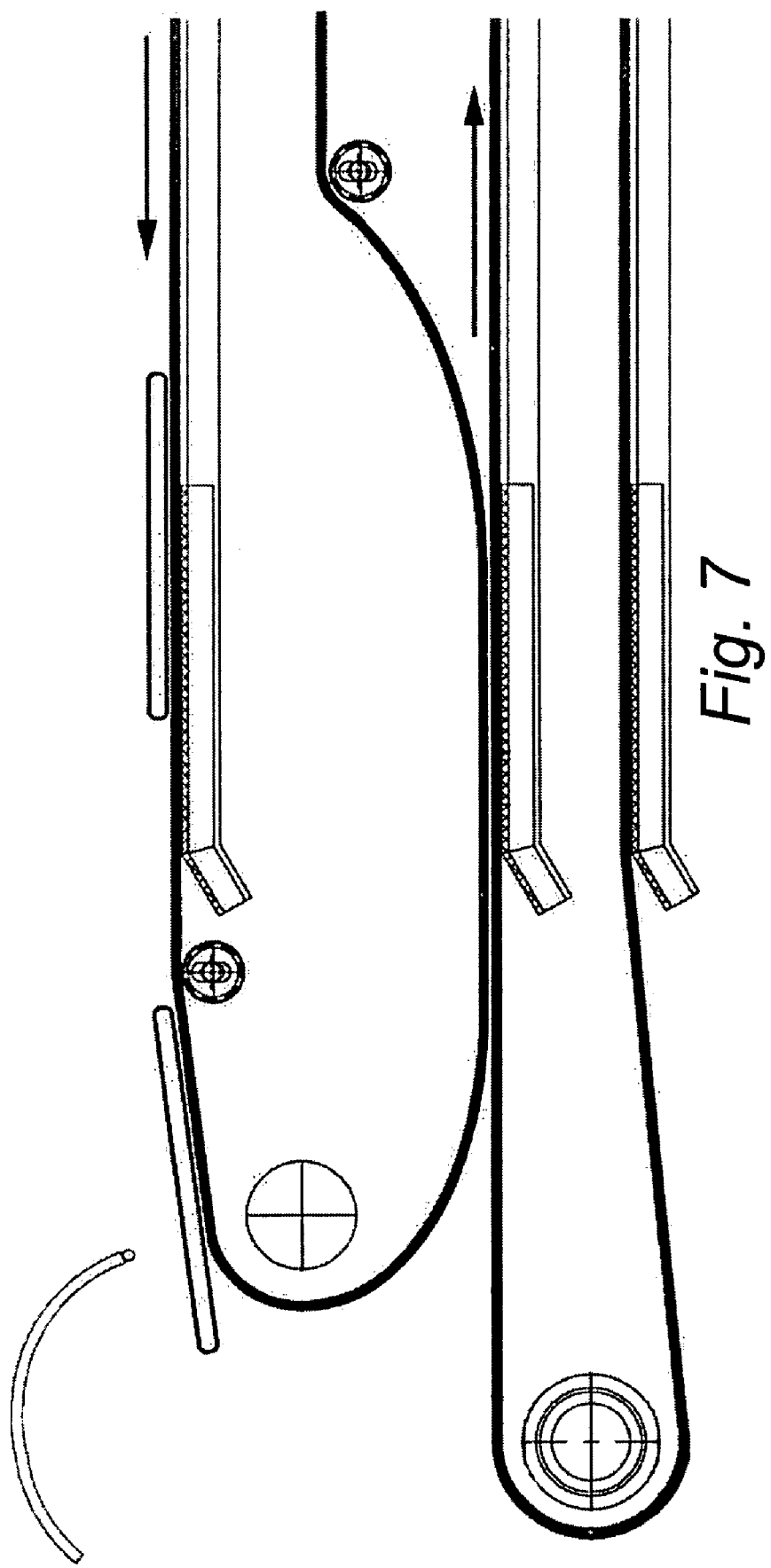
FIG. 7 is a side elevation view of the embodiment of the present invention shown in FIG. 4, with the wire transfer guide rotated for access to the discharge end of the upper conveyor.
Figure 8:
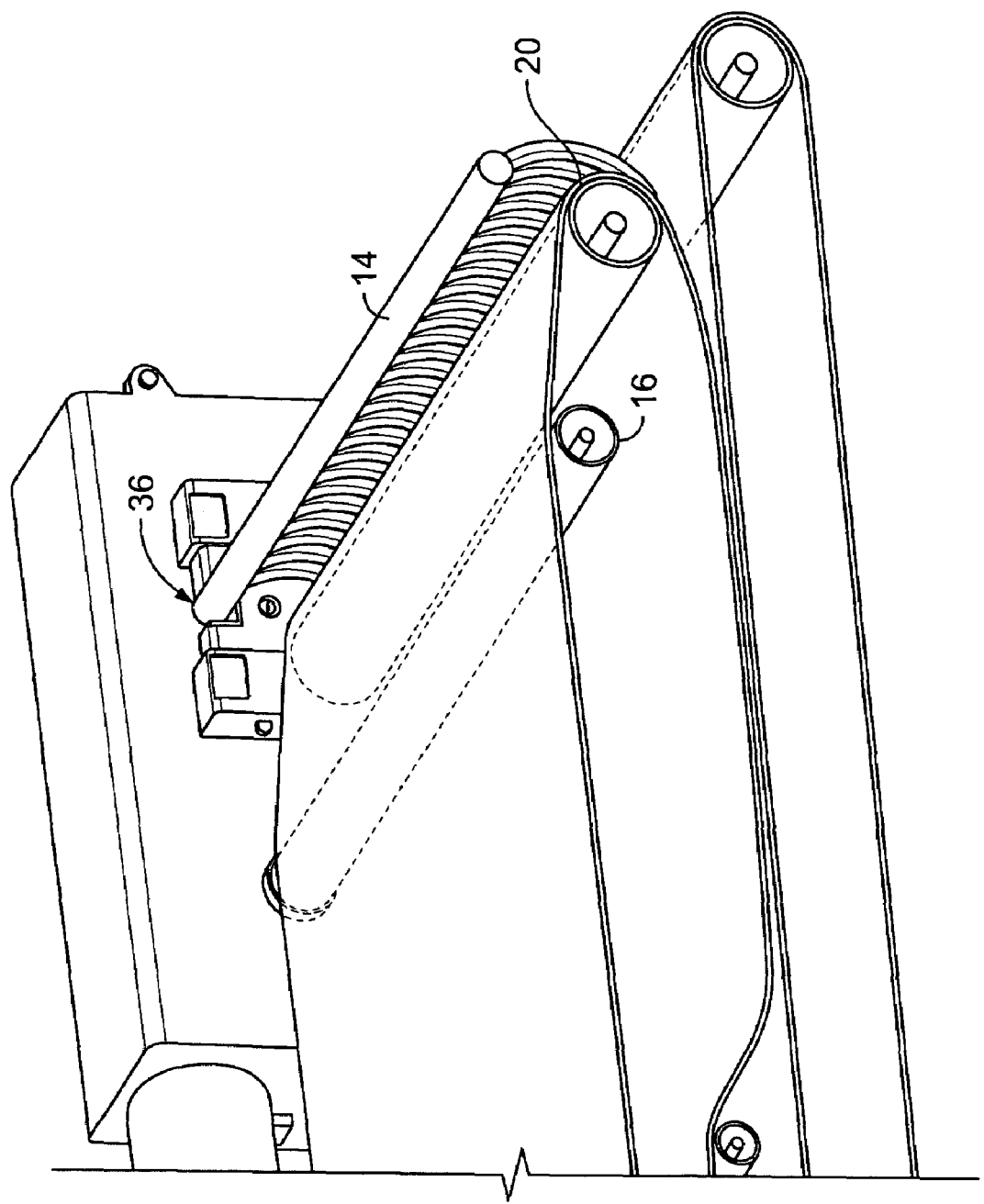
FIG. 8 is a perspective view of a wire transfer guide, useable in various embodiments of the present invention.

The transfer guide 14 is located adjacent to the discharge end of the upper conveyor 10 and is of approximately the same width. Various transfer guides are known in the art, including stationary, powered, and curved wire rods. The choice of transfer guide is optional, but one preferred transfer guide 14 is generally arcuate in shape, and comprises laterally spaced, individual curved wire rods, as shown in FIG. 8. In this embodiment, the curved rods are kept relatively short, meaning they are only long enough to provide guidance onto the lower conveyor. In a still further embodiment, the transfer guide is pivotably mounted so that it may be rotated allowing easy access to the conveyor ends, as shown in FIG. 7. Optionally, the transfer guide is removable to allow easy cleaning, and also to allow workers to clear jams easily should they occur.

In the embodiment shown in FIG. 2, the combination of the downward sloping section 22 and shortened curved rods in the transfer guide 14 decreases the time tortillas spend in the transfer chute (the space between the transfer guide 14 and the discharge end of upper conveyor 10), making "jam ups" less likely.

The lower conveyor 12 has a second endless belt 30 supported between two end rollers (only a second end roller 32 on the left side, in this case a drive roller, is shown in FIG. 2).

The second endless belt 30 is approximately the same width as the first endless belt 18. The first endless belt 18 and second endless belt 30 move generally towards and away from transfer guide 14, preferably at approximately the same speed. (Some systems might allow for differing speeds, or temporary pausing of one of the belts.) Each belt has an upper run and a lower run.

As noted above, maintaining the longitudinal spacing between products is important for high speed systems. As the tortilla passes through the transfer chute, the tortilla increases in speed, and as the tortilla enters onto the lower conveyor 12 the tortilla may slide forward with a longitudinal speed relative to the second belt 30. This results in uneven longitudinal spacing between the tortillas.

Figure 3:
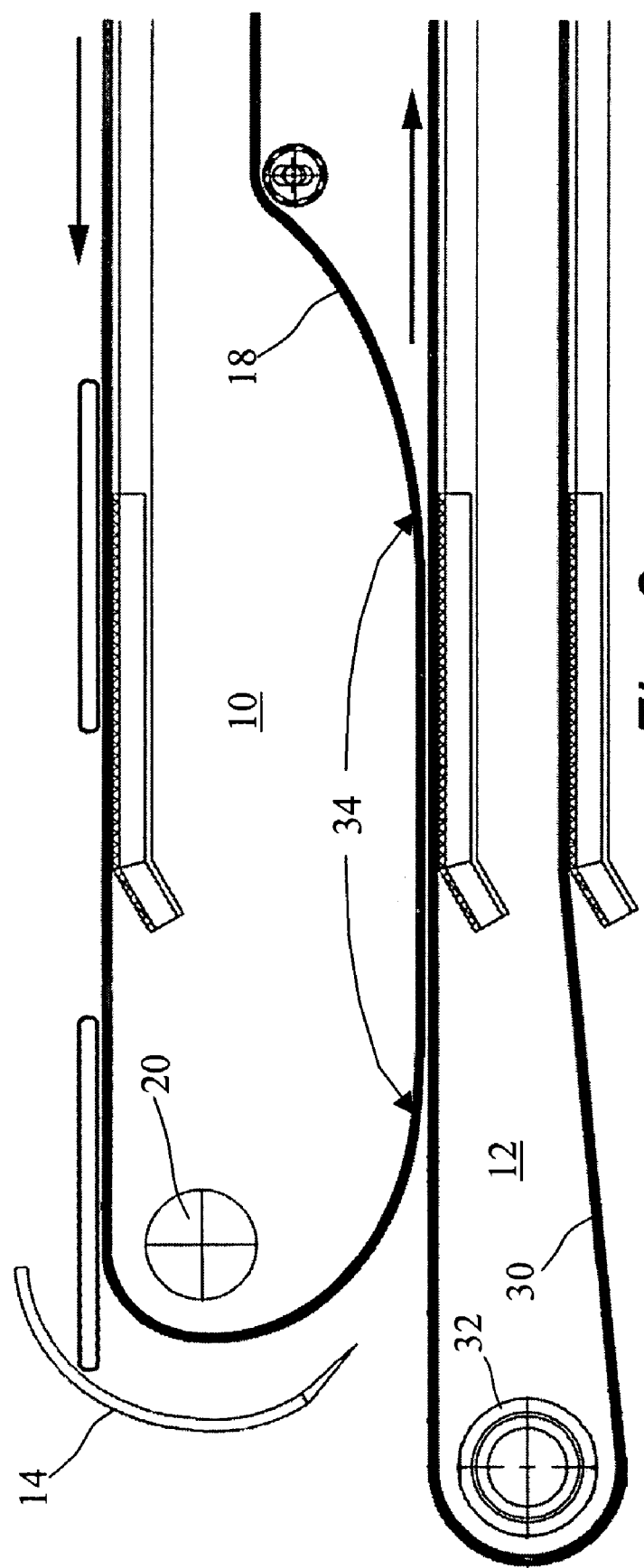
FIG. 3 is a side elevation view of another embodiment of the present invention for transferring food objects between conveyors, showing a belt slack portion of the upper conveyor.
Figure 5:
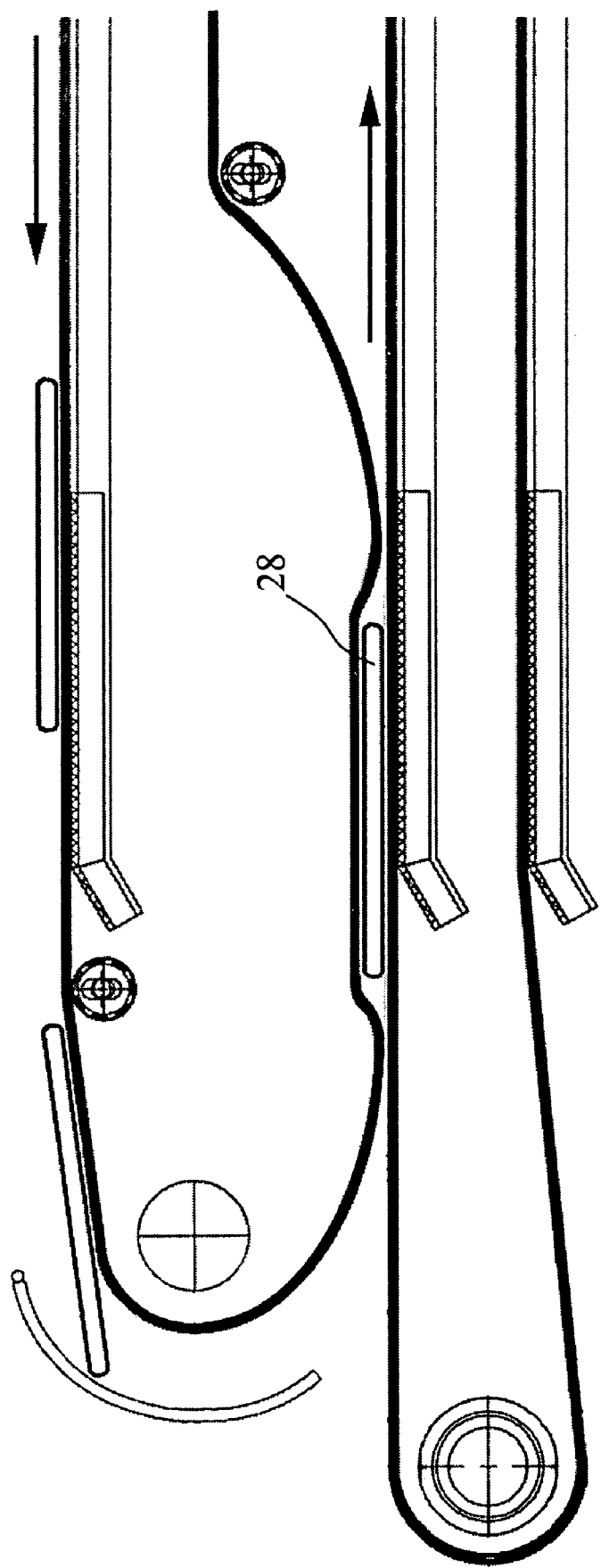
FIG. 5 is a side elevation view of the embodiment of FIG. 4, showing a food object under a belt slack portion of the upper conveyor.

In a second embodiment shown in FIG. 3, a belt slack 34 is introduced into the lower run of the first endless belt 18 on the upper conveyor 10. This belt slack 34 allows the lower run of the first endless belt 18 to drape onto the upper run of the second endless belt 30 on the lower conveyor 12, which causes the product being accelerated around the transfer to be slowed back down to the mutual speed of the conveyors, and keeps the product from overlapping product in front of or behind it. In a preferred embodiment, the lower run of first endless belt 18 is allowed to touch the upper run of second endless belt 30, but as will be evident, it is sufficient for the belt spacing between the upper run and lower run to be approximately equal to or less than the thickness of the product being transferred. In this way the lower run of the first belt is allowed to come into contact with the upper side of the product. As is shown in FIG. 5, this traps the product 28 between the upper run and lower run for a period of time long enough to modify the longitudinal speed of the product.

The amount and length of belt slack 34, the spacing between the upper conveyor 10 and lower conveyor 12, and the spacing between the upper run and lower run should be chosen based on the conveyor design and product thickness.

Figure 4:
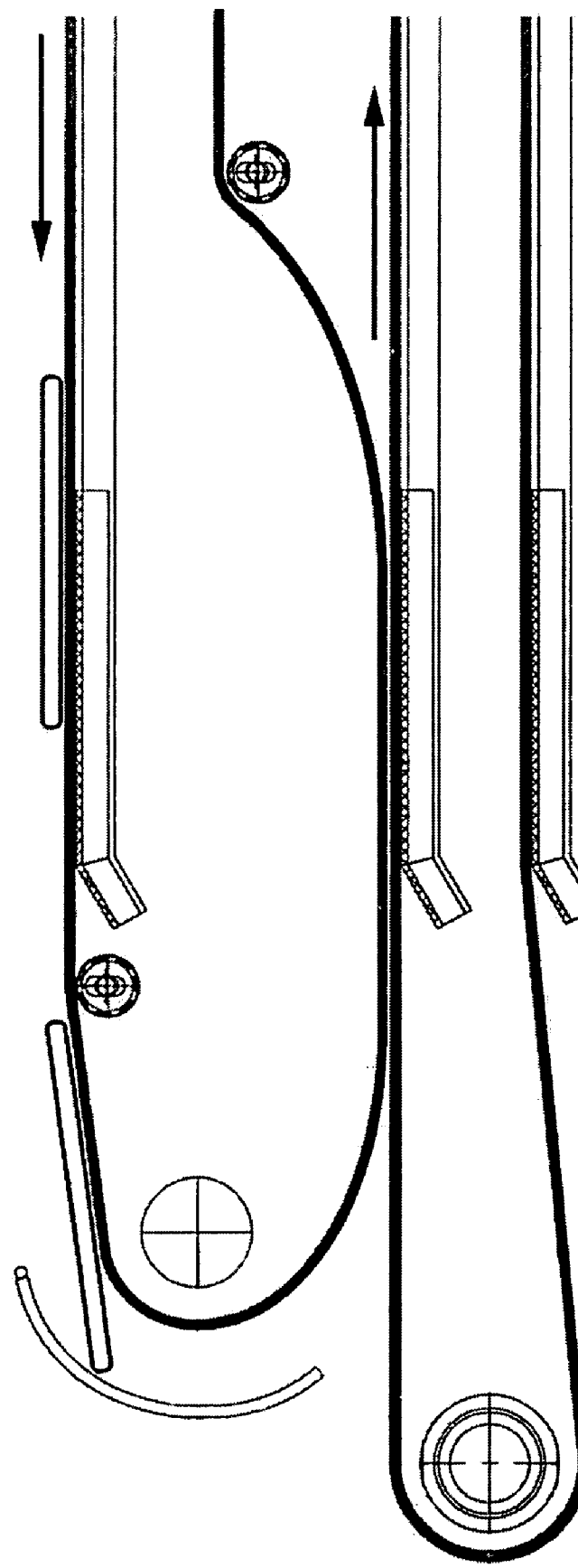
FIG. 4 is a side elevation view of a further embodiment of the present invention, incorporating aspects of the embodiments shown in FIG. 2 and FIG. 3.

Optionally, the embodiments can be combined in various combinations, with an exemplar shown in FIG. 4. Here, a downward sloping section 22 is combined with a belt slack 34, with a transfer guide 14 comprising relatively shortened curved rods connected to a pivot mount 36.

Multi-tiered stacks may be created using various embodiments of the present invention, with an exemplar shown in FIG. 6. Here, each side of the conveyor becomes alternately an upper conveyor 10 with a discharge end and a lower conveyor 12 with a receiving end. The product thus moves downward in the stack in a serpentine fashion with limited contact with intermediate transfer guides, while maintaining the tortillas' longitudinal position.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Also, any element in a claim that does not explicitly state "means for" performing a specified function or "step for" performing a specified function, should not be interpreted as a "means" or "step" clause as specified in 35 U.S.C. section 112.

Although the present invention has been discussed in considerable detail with reference to certain preferred embodiments, other embodiments are possible. The embodiments shown are for use within or in conjunction with commonly used production machinery such as a cooling conveyor, but its use is not intended to this application only but also with any process which requires transferring products, such as disc shaped objects, between two or more horizontal conveyors. By way of example, reference is made to tortillas, but the present system and method also has application to any similar shaped object or flat product. Therefore, the scope of the appended claims should not be limited to the description of preferred embodiments contained in this disclosure.

I claim:

1. A system for transferring an object between driven conveyors, comprising:
   an upper conveyor comprising a discharge end; a first belt for transporting the object, the first belt engaging a first end roller and a gooseneck roller, where the first end roller is disposed below the gooseneck roller by a displacement sufficient to create a downward sloping section in the first belt;
   a transfer guide located adjacent to the discharge end of the upper conveyor, to receive the object from the downward sloping section;
   a lower conveyor comprising a second belt to receive the object from the transfer guide; and
   means for driving the upper conveyor and the lower conveyor such that the first belt moves towards the transfer guide and the second belt moves away from the transfer guide;
   wherein the first belt and the second belt each comprise an upper run and a lower run; and
   wherein the lower run of the first belt has a slack such that a portion of the lower of the first belt contacts the upper run of the second belt.

2. The system of claim 1, wherein the transfer guide comprises laterally spaced individual curved wire rods connected to a common axle.

3. The system of claim 1, wherein the transfer guide comprises laterally spaced individual curved wire rods connected to a pivotably mounted common axle.

4. The system of claim 1, wherein the first belt and the second belt are endless and move at approximately the same speed.

5. A system for transferring an object between driven conveyors, comprising:
   an upper conveyor comprising a discharge end; a first belt for transporting the object and having an upper run and a lower run, the first belt engaging a first end roller;
   a transfer guide located adjacent to the discharge end of the upper conveyor, to receive the object from the upper conveyor;
   a lower conveyor comprising a second belt having an upper run and a lower run, to receive the object from the transfer guide;

means for driving the upper conveyor and the lower conveyor such that the upper run of the first belt moves toward the transfer guide and the upper run of the second belt moves away from the transfer guide;

wherein the lower run of the first belt has a slack such that a portion of the lower run of the first belt contacts the upper run of the second belt.

6. The system of claim 5, wherein the transfer guide comprises laterally spaced individual curved wire rods connected to a common axle.

7. The system of claim 5, wherein the transfer guide comprises laterally spaced individual curved wire rods connected to a pivotably mounted common axle.

8. The system of claim 5, wherein the first belt and the second belt are endless and move at approximately the same speed.

9. A system for transferring an object between driven conveyors, comprising:

means for transporting the object on a first belt on an upper conveyor having a discharge end, the first belt engaging a first end roller and a gooseneck roller, where the first end roller is disposed below the gooseneck roller by a displacement sufficient to create a downward sloping section in the first belt;

means for transferring the object from the discharge end of the upper conveyor;

means for receiving the object onto a lower conveyor comprising a second belt;

means for driving the upper conveyor and the lower conveyor such that the first belt moves towards the means for transferring and the second belt moves away from the means for transferring; and means for modifying a longitudinal speed of the object after the object is received onto the lower conveyor.

10. A system for transferring an object between driven conveyors, the object having a thickness, comprising:

means for transporting the object on an upper conveyor comprising a first belt having a discharge end;

means for transferring the object from the discharge end of the upper conveyor;

means for receiving the object onto a lower conveyor comprising a second belt, the object having a longitudinal speed relative to the second belt;

means for modifying the longitudinal speed of the object after it is received onto the lower conveyor; and means for driving the upper conveyor and the lower conveyor such that the first belt moves towards the means for transferring and the second belt moves away from the means for transferring.

11. A method for transferring an object between driven conveyors, comprising the steps of:

transporting the object on a first belt on an upper conveyor having a discharge end characterized by a downward sloping section;

transferring the object from the discharge end of the upper conveyor through a transfer chute located adjacent to the discharge end of the upper conveyor;

receiving the object from the discharge chute onto a lower conveyor comprising a second belt; and driving the upper conveyor and the lower conveyor such that the first belt moves towards the transfer chute and the second belt moves away from transfer chute;

wherein the object further comprises a thickness, and a longitudinal speed relative to the second belt; wherein the first belt further comprises an upper run and a lower run; and further comprising a step after the object is received onto the lower conveyor of modifying the longitudinal speed of the object by having the object contact the lower run of the first belt.

12. The method of claim 11, wherein the driving step further comprises moving the first belt and the second belt at approximately the same speed.

13. A method for transferring an object between driven conveyors, the object having a thickness, comprising the steps:

transporting the object on a first belt having an upper run and a lower run on an upper conveyor having a discharge end;

transferring the object from the discharge end of the upper conveyor through a transfer chute located adjacent to the discharge end of the upper conveyor;

receiving the object from the discharge chute onto a lower conveyor comprising a second belt having an upper run and a lower run, the object having a longitudinal speed relative to the second belt;

modifying the longitudinal speed of the object by having the object contact the lower run of the first belt after the object is received onto the lower conveyor; and driving the upper conveyor and the lower conveyor such that the upper run of the first belt moves towards the transfer chute and the upper run of the second belt moves away from transfer chute.

14. The method of claim 13, wherein the driving step further comprises moving the first belt and the second belt at approximately the same speed.

* * * * *